United States Patent [19]

Ishimaru et al.

[11] 3,867,371

[45] Feb. 18, 1975

[54] PROCESS FOR PRODUCING PENICILLIN ESTERS

[75] Inventors: Toshiyasu Ishimaru, Suita; Yutaka Kodama, Toyama, both of Japan

[73] Assignee: Toyama Chemical Co. Ltd, Tokyo, Japan

[22] Filed: June 28, 1972

[21] Appl. No.: 267,147

[30] Foreign Application Priority Data
July 8, 1971  Japan.............................. 46-50447

[52] U.S. Cl............................. 260/239.1, 424/271
[51] Int. Cl............................................ C07d 99/16
[58] Field of Search................................ 260/239.1

[56] References Cited
UNITED STATES PATENTS 3,647,787  3/1972  Cooper........................... 260/239.1
3,668,202  6/1972  Foster et al..................... 260/239.1

Primary Examiner—Nicholas S. Rizzo
Attorney, Agent, or Firm—Oblon, Fisher, Spivak, McClelland & Maier

[57] ABSTRACT

Penicillin or penicillin sulfoxide esters are prepared in an industrially advantageous manner, by reacting an N,N-disubstituted acid amide with a halogenating agent, reacting the thus obtained product with a salt of penicillin or penicillin sulfoxide, and then reacting the product with an hydroxy compound in the presence of an acid-binding agent.

6 Claims, No Drawings

PROCESS FOR PRODUCING PENICILLIN ESTERS

BACKGROUND OF THE INVENTION

1. Field of the Invention:

This invention relates to a process for producing penicillin or penicillin sulfoxide esters.

2. Description of the Prior Art:

Penicillin or penicillin sulfoxide esters such as, for example, the 2,2,2-trichloroethyl ester, the 5-nitrobenzyl ester, and the like, are very useful as starting materials for the production of 7-acylamido-3-methyl-3-cephem-4-carboxylic acid esters which are useful antibacterial agents.

These esters have heretofore been produced by reacting a salt of penicillin or penicillin sulfoxide with 2,2,2-trichloroethylchloroformate in the presence of a solvent, and then decarboxylating the thus obtained mixed acid anhydride with a base. (See Chemical Abstracts 74, 22826; 74, 22861 (1971)). It is also known to produce these esters by reacting penicillin or a penicillin sulfoxide with an alcohol and phosgene in the presence of an acid-binding agent (see Chemical Abstracts 73, 79032 (1970), and Japanese Pat. Publication No. 31306/1970).

These prior art techniques, however, are complicated and are entirely unsatisfactory from an industrial point of view and from the standpoint of yield.

It would be desirable, therefore, to provide a process for producing such esters in high yield and using a less complex technique which would be more industrially attractive.

SUMMARY OF THE INVENTION

The present invention relates to a process for producing penicillin or a penicillin sulfoxide ester whereby an N,N-disubstituted-acid amide represented by the formula (I):

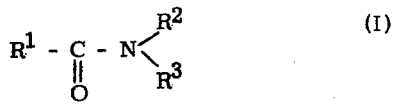

wherein $R^1$ represents hydrogen, or a substituted or unsubstituted alkyl, aryl, aralkyl or cycloalkyl group; $R^2$ and $R^3$, which may be the same or different, represent alkyl groups, or $R^2$ and $R^3$ together may jointly form a pyrrolidine, piperidine, or morpholine ring together, is reacted with a halogenating agent. The thus obtained product is then reacted with a penicillin salt or a penicillin sulfoxide salt and then the product thus obtained is reacted with an hydroxy compound represented by the formula (II):

$$R - OH \quad (II)$$

wherein R represents a substituted or unsubstituted alkyl, aryl, aralkyl, acyloxyalkyl or heterocyclic group, in the presence of an acid-binding agent.

DESCRIPTION OF PREFERRED EMBODIMENTS

Suitable N,N-disubstituted-acid amides (I) useable herein include N,N-dimethylformamide, N,N-diethylformamide, N,N-dimethylacetamide, N,N-diethylacetamide, N,N-dimethylpropionamide, N,N-dimethylbutyramide, N,N-dimethylvaleramide, N,N-dimethylcapramide, N,N-dimethylbenzamide, N,N-dimethylphenylacetamide, N,N-dimethylhexahydrobenzamide, N-formylpyrroliine, N-acetylpyrrolidine, N-formylpiperidine, N-acetylpiperidine, N-formylmorpholine, N-acetylmorpholine, and the like. Particularly preferable are N,N-dimethylformamide, N,N-dimethylacetamide, N,N-diethylformamide, etc., because they may be readily removed by washing with water after the reaction.

The N,N-disubstituted acid amide (I) may be used in more than an equimolar amount based on the moles of penicillin salt or penicillin sulfoxide salt used. Preferably 2 to 5 mols./mole is used. It is also possible to use the acid amide (I) in substantial excess so that it functions as both reactant and solvent.

Inert solvents which can be used herein include, for example, methylene chloride, chloroform, carbon tetrachloride, ethylene chloride, methylchloroform, ethyl acetate, acetonitrile, dioxane, tetrahydrofuran, benzene, toluene, monochlorobenzene, ethyl ether, isopropyl ether, dimethylsulfoxide, or mixtures thereof.

Suitable halogenating agents include, for example, phosphorus oxychloride, phosphorus oxybromide, phosphorus pentachloride, phosphorus pentabromide, sulfurylchloride, thionylchloride, thionylbromide, phosgene, carbonylbromide, thiophosgene, etc. These agents are intended to react with the N,N-disubstituted-acid amide (I) to form a so-called Vilsmeyer reagent. The Vilsmeyer reagent is a complex compound, and the intermediate structure will depend upon the type of the halogenating agent and the reaction conditions. For example, if phosphorus pentachloride is reacted with 2 mols. of N,N-disubstituted-acid amide (I), the reaction is considered to proceed as follows:

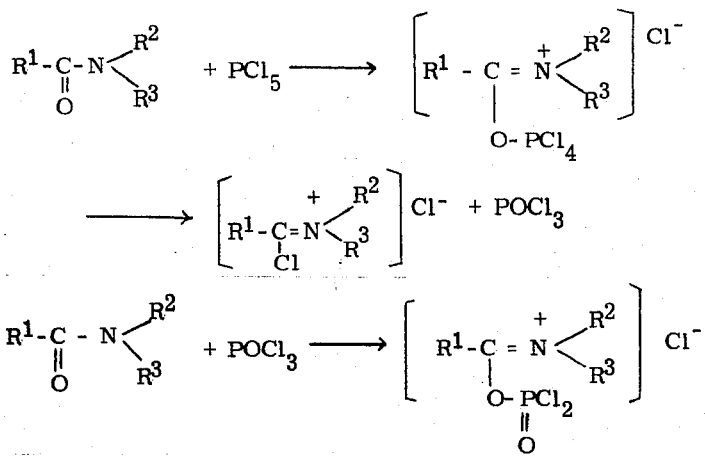

If thionylchloride or phosgene is used, the reaction is believed to proceed as follows:

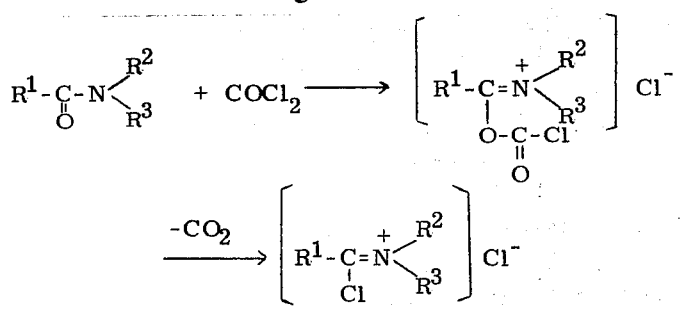

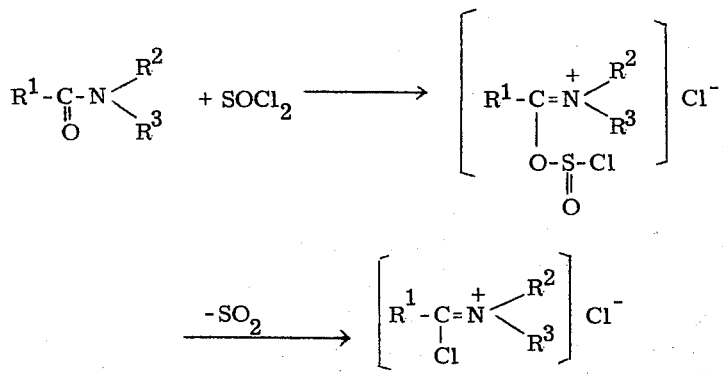

The penicillin and penicillin sulfoxides useful herein are represented by the formulae:

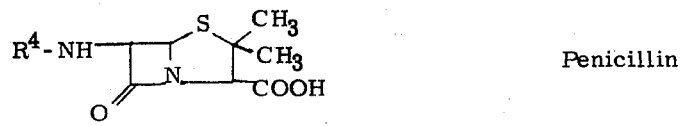

Penicillin

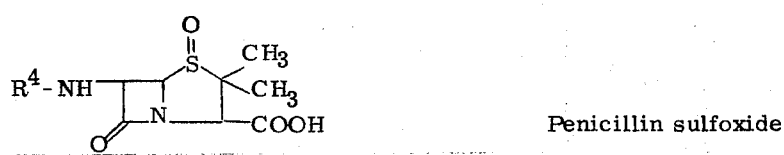

Penicillin sulfoxide wherein $R^4$ represents an acyl group. These compounds may be used in the form of their alkali or alkali earth metal salts or their organic tertiary amine salts. Especially preferred for uses are the salts of sodium, potassium, magnesium, calcium, triethylamine, tributylamine, N-methylmorpholine, N-ethylpiperidine, pyridine, picoline, colidine, lutidine salts, etc. Penicillin G, penicillin V, or the sulfoxides thereof, are most preferred because they can be easily produced biologically at low cost.

Of course, any penicillins or penicillin sulfoxides which can be converted into a cephalosporin characterized by good antibacterial activity may be used herein. These penicillins and penicillin sulfoxides may have an acyl group in its 6-position such as a thienylacetyl group, N-protected-α-aminophenylacetyl group, α-aminothienylacetyl group, α-amino-substituted-phenylacetyl group, or the like.

The hydroxy compound represented by the general formula (II) should be reactive such that the sulfoxide ester can be converted into 7-acylamido-3-methyl-3-cephem-4-carboxylic acid ester in high yield by ring expansion, and which can thereafter be easily cleaved by hydrolysis. Alternatively, the hydroxy compound may form esters of 7-acylamido-3-methyl-3-cephem-4-carboxylic acid which, taken orally, will be absorbed into the blood in high concentration. The easily cleavable esters include, for example, esters obtained from alcohols such as, for example, 2-bromoethanol, 2-iodoethanol, 2,2-dichloroethanol, 2,2,2-trichloroethanol, nitrophenol, chloronitrophenol, pentachlorophenol, benzylalcohol, bromobenzylalcohol, methoxybenzylalcohol, nitrobenzylalcohol, benzhydrylalcohol, bis(4-methoxyphenyl)methanol, N-hydroxysuccinimide, N-hydroxyphthalimide, succinimidomethanol, phthalimidomethanol, phenacylalcohol, etc. The esters obtained from alcohols such as, for example, acetoxymethanol, propionyloxymethanol, diethylacetoxymethanol, pivaloyloxymethanol, etc., show high concentrations in the blood when administered orally as cephalosporin esters.

In carrying out the process of this invention, the N,N-disubstituted acid-amide is dissolved in a suitable solvent and the halogenating agent is added gradually per se or is first diluted with a suitable solvent while being cooled so as to prepare a Vilsmeyer reagent. Alternatively, the halogenating agent is added directly to the acid-amide without the use of a solvent. The reaction may be carried out at the temperature in the room of from room temperature to −50°C. The Vilsmeyer reagent thus obtained is cooled to −30° to −60°C., and the penicillin salt or penicillin sulfoxide salt is added thereto, so as to gradually dissolve the crystals. After the mixture is stirred for 0.5 to 1 hour at the same temperature, the mixture of the hydroxy compound and an acidbinding agent is gradually added dropwise thereto. Suitable acidbinding agents useable include, for example, the tertiary amines, such as pyridine, picoline, lutidine, collidine, quinoline, dimethylaniline, diethylaniline, triethylamine, tributylamine, etc. At the completion of the addition, the mixture is further reacted at the same temperature of 1 to 2 hours, and then the temperature is raised gradually. When the mixture reaches 0° to 20°C., it is diluted with ice water. If necessary, a suitable water-immiscible solvent, such as, for example, ether, methylene chloride, chloroform, ethyl acetate, or the like is added thereto, and the pH of the solution is adjusted to 7 to 8 with an alkali hydrogen carbonate, so as to cause a separation of an organic layer which is collected. After the organic layer is washed with water, and dried, the solvent is evaporated to obtain the intended product. This technique is capable of producing the product in relatively high yields.

The penicillin esters thus obtained may be oxidized with any conventional oxidizing agent to form an ester of penicillin sulfoxide. This ester can then be subjected to a ring expansion reaction with a conventional catalyst to form an ester of 7-acylamido-3-methyl-3-cephem-4-carboxylic acid.

It should be understood from the foregoing description that the present invention is a process for producing penicillin or penicillin sulfoxide esters with very simple operation in high yield. The process is industrially attractive economically and is capable of producing intermediates which are useful for subsequent conversion to cephalosporins.

The following Examples are given by way of illustration only and are not to be construed as limiting unless otherwise specified herein.

EXAMPLE 1

1.54 ml. of dimethylformamide was dissolved in 8 ml. of methylene chloride, and a solution of 1.84 g. of phosphorus oxychloride in methylene chloride was added dropwise thereto at 0°C. After being stirred for 30 minutes, 3.72 g. of penicillin G potassium salt was added thereto at −55° to −50°C. over a period of 5 minutes, and the mixture was stirred at the same temperature for 10 minutes, until a clear solution was formed. The solution was reacted at −50° to −40°C. for 30 minutes, and a solution of 1.48 g. of 2,2,2-trichloroethanol and 1.4 ml. of triethylamine in 5 ml. of methylene chloride was added dropwise thereto over a period of 5 minutes. The mixture was then reacted at −50° to −40°C. for 30 minutes, and thereafter was gradually raised to room temperature. It was diluted with ice water, and the pH was immediately adjusted to 7.2 with sodium hydrogen carbonate, and an organic layer was collected. After the organic layer was sufficiently washed with water, it was dried over anhydrous magnesium sulfate, and then was concentrated under reduced pressure to obtain pale yellow plate crystals. These were washed with n-hexane to obtain 4.35 g. (93.5 percent) of 2,2,2-trichloroethyl ester of penicillin G having a melting point of 144° to 148°C. After recrystallization from ethyl acetate-n-hexane, white crystals having a melting point of 155° to 156°C. were obtained.

EXAMPLE 2

The procedure of Example 1 was repeated under the same reaction conditions, except that a solution of 1.2 g. of phosgene in methylene chloride was used instead of phosphorus oxychloride, and there was obtained 4.3 g. (92.5 percent) of 2,2,2-trichloroethyl ester of penicillin G having a melting point of 147° to 149°C.

EXAMPLE 3

A solution of 1.2 g. of phosgene in 10 ml. of methylene chloride was added dropwise to a mixture of 2.2 ml. of diethylformamide and 4 ml. of methylene chloride at −55° to −50°C. over a period of 5 minutes, to effect deposition of white crystals. After being stirred at the same temperature for 30 minutes, 3.9 g. of potassium salts of penicillin G sulfoxide was added over a period of 2 minutes. When stirred at −50° to −45°C. for 2 hours, a clear solution was formed. After further reaction for 20 minutes, a solution of 1.3 g. of 2,2,2-trichloroethanol and 1.0 g. of pyridine in methylene chloride was added dropwise thereto at −50° to −45°C. over a period of 10 minutes. The mixture was stirred at this temperature for 1 hour, and the temperature was raised gradually to room temperature. The mixture was then diluted with ice water, and the pH was adjusted immediately to 7.2 with sodium hydrogen carbonate, and an organic layer was collected. After the organic layer was washed with water, it was dried over anhydrous magnesium sulfate, and was concentrated under reduced pressure to obtain pale yellow crystals. These crystals were washed with n-hexaneether, to obtain 4.4 g. (91.5%) of white crystals of 2,2,2-trichloroethyl ester of penicillin G sulfoxide having a melting point of 161° to 164°C. When recrystallized from methanol, clear needles having a melting point of 170° to 173°C. were obtained.

EXAMPLE 4

A solution of 1.2 g. of phosgene in 10 ml. of methylene chloride was added dropwise to a mixture solution of 1.54 ml. of dimethylformamide and 4 ml. of methylene chloride at −55° to −50°C. over a period of 5 minutes, to effect the deposition of a large quantity of white crystals. After being stirred at the same temperature for 30 minutes, 4.04 g. of potassium salts of penicillin V sulfoxide was added thereto at −50°C. and it was reacted at −50° to −40°C. for 3 hours. A solution of 1.3 g. of 2,2,2-trichloroethanol and 0.97 ml. of pyridine in 4 ml. of methylene chloride was added dropwise at the same temperature over a period of 6 minutes thereto, and the mixture was reacted at −50° to −40°C. for 30 minutes, at −40° to 0°C. for 1 hour, and at 3°C. for 2 hours. It was then diluted with ice water, and the pH was adjusted to 7.2 with sodium hydrogen carbonate. An organic layer formed and was collected, dried over anhydrous magnesium sulfate, and concentrated at reduced pressure. An ether was added to the residue, and there was then deposited white crystals after once dissolved. The crystals were collected by filtration, and washed with n-hexane to obtain 4.7 g. (94.5 percent) of pale yellow crystals of 2,2,2-trichloroethyl ester of penicillin V sulfoxide having a melting point of 140° to 141°C. When recrystallized from ethyl acetate-n-hexane, white crystals having a melting point of 146° to 147°C. were obtained.

EXAMPLE 5

1.2 g. of phosphorus pentachloride was added to a solution of 2.0 ml. of dimethylacetamide and 15 ml. of methylene chloride at 0°C. It was dissolved with a slight exothermic reaction. After the mixture was stirred at 0° to 10°C. for 30 minutes, it was cooled to −55°C., and 3.72 g. of penicillin G potassium salt was added thereto, and stirred for 2 hours. Then, a solution of 1.15 ml. of 2,2,2-trichloroethanol and 0.97 ml. of pyridine in 5 ml. of methylene chloride was gradually added at −60° to −55°C. The mixture was reacted at −55° to −45°C. for 2.5 hours and diluted with ice water, and the pH was adjusted to 7.0 with sodium hydrogen carbonate. An organic layer formed and separated and was washed with water, and dried over magnesium sulfate. The solvent was evaporated under reduced pressure. A slight amount of isopropylalcohol was added to the residue, and crystals were formed which were collected by filtration to obtain 4.1 g. (88.5 percent) of white crystals of 2,2,2-trichloroethyl ester of penicillin G having a melting point of 147° to 149°C.

EXAMPLE 6

1.54 ml. of dimethylformamide was dissolved in 10 ml. of methylene chloride, and a solution of 1.2 g. of thionylchloride in 5 ml. of methylene chloride was added dropwise at −50°C. over a period of 5 minutes. Thereafter, the mixture was maintained at the same temperature for 30 minutes. 3.72 g. of penicillin G potassium salt was added thereto at −55° to −50°C., and the mixture was stirred at −50° to −40°C. for 1 hour. Then, a solution of 1.48 g. of 2,2,2-trichloroethanol and 1.4 ml. of triethylamine in 5 ml. of methylene chloride was added dropwise thereto at −55° to −50°C. over a period of 5 minutes. The mixture was reacted at −50° to −40°C. for 30 minutes, and at −40° to 0°C. for 2 hours, and then diluted with ice water. Thereafter, the procedure of Example 5 was repeated to obtain 4.3 g. (92.5 percent) of white crystals of 2,2,2-trichloroethyl ester of penicillin C having a melting point of 142° to 146°C.

EXAMPLE 7

15 g. of penicillin G potassium salt was suspended in 48 ml. of methylene chloride, and the mixture was cooled to −55° to −45°C.

Meanwhile, 5.85 g. of dimethylformamide and 9 ml. of methylene chloride were mixed, and 8.7 g. of phosphorus oxychloride was added dropwise thereto at 20° to 25°C. The mixture was reacted for 30 minutes while being stirred.

The latter reaction mixture was gradually added dropwise to the former suspension at −55° to −45°C., and the mixture was stirred at the same temperature for 4 hours. To this mixture was added, dropwise, a mixture of 6.56 g. of phenacylalcohol, 5.7 g. of pyridine and 10 ml. of methylene chloride at −55° to −45°C. over a period of 30 minutes and the mixture was stirred for 30 minutes. The reaction mixture was poured into 60 ml. of ice water and was washed while being stirred, and an organic layer was formed. This layer was collected. The organic layer was added to 60 ml. of ice water while being stirred, and adjusted to a pH of 7.0 with sodium hydrogen carbonate. After washing with water, the organic layer was concentrated under reduced pressure. The residue was washed with ether to obtain 14.9 g. (80 percent) of phenacyl ester of penicillin G as white crystals having a melting point of 130° to 133°C.

EXAMPLE 8

4 g. of penicillin V sulfoxide potassium salt was suspended in 13 ml. of methylene chloride, and the mixture was cooled to −55° to −45°C.

Meanwhile, 1.45 g. of dimethylformamide and 3 ml. of methylene chloride were mixed and 1.82 g. of phosphorus oxychloride was gradually added dropwise thereto at 20° to 25°C., and then the mixture was reacted at the same temperature for 30 minutes while being stirred.

The latter reaction mixture was gradually added dropwise to the former suspension at −55° to −45°C., and the mixture was stirred at the same temperature for 4 hours. To this solution was added dropwise a mixture of 1.63 g. of 4-methoxybenzylalcohol, 0.96 g. of pyridine and 3 ml. of methylene chloride at −55° to −45°C. over a period of 30 minutes, and then the mixture was reacted for 30 minutes. The reaction mixture was poured into 20 ml. of ice water and washed while being stirred, and after the mixture was allowed to stand, an organic layer separated and was collected.

Thereafter, the procedure of Example 7 was repeated to obtain 4.22 g. (85 percent) of 4-methoxybenzyl ester of penicillin V sulfoxide having a melting point of 126° to 129°C.

EXAMPLE 9

10 g. of penicillin G sulfoxide potassium salt was suspended in 35 ml. of methylene chloride, and the mixture was cooled to −55° to −45°C.

On the other hand, 3.92 g. of dimethylformamide and 10 ml. of methylene chloride were mixed, and 4.56 g. of phosphorus oxychloride was added dropwise thereto at 20° to 25°C., and the mixture was reacted.

The latter reaction mixture was gradually added dropwise to the former suspension at −55° to −45°C., and the mixture was reacted at the same temperature for 4 hours. To this solution was added dropwise a mixture of 5.15 g. of 2-chloro-4-nitrophenol, 2.54 g. of pyridine and 10 ml. of methylene chloride at −55° to −45°C., and then the mixture was reacted at the same temperature for 30 minutes. The reaction mixture was washed with 50 ml. of ice water, and 50 ml. of ice water was added thereto, and then sodium hydrogen carbonate was added while being stirred to adjust to a pH of 7.0. The organic layer was collected and was concentrated under reduced pressure to obtain a pale brown oil. When this was crystallized with n-hexane and treated with ether, there was obtained 11.3 g. (87 percent) of 2-chloro-4-nitrophenol ester of penicillin G sulfoxide. Then, when recrystallized from ether, there was obtained white needles having a melting point of 129° to 131°C.

EXAMPLE 10

10 g. of penicillin G potassium salt was suspended in 35 ml. of methylene chloride, and the mixture was cooled to −55° to −45°C.

Meanwhile, 4.95 g. of phosphorus oxychloride was added dropwise to the mixture of 4.3 g. of dimethylformamide and 10 ml. of methylene chloride at 20° to 25°C., and then the mixture was reacted at the same temperature for 30 minutes.

Then, the latter reaction mixture was added dropwise to the former suspension at −55° to −45°C., and dissolution occurred with an exothermic reaction. The mixture was reacted while being stirred for 4 hours. The mixture of 5.6 g. of 2-chloro-4-nitrophenol, 3.2 g. of pyridine and 10 ml. of methylene chloride was added dropwise thereto at −55° to −45°C. over a period of 30 minutes. After dropping, the mixture was further stirred for 30 minutes, and then the mixture was poured into 50 ml. of ice water, and after being washed with water, an organic layer separated and collected. After 50 ml. of ice water was added to the organic layer and the pH adjusted to 7.0 with sodium hydrogen carbonate, the organic layer was concentrated under reduced pressure, and there was then obtained 12.9 g. (95 percent) of 2-chloro-4-nitrophenol ester of penicillin G as pale yellow syrup. This ester was dissolved in 55 ml. of methylene chloride, and 5.1 g. of 40 percent peracetic acid was added dropwise thereto at 0° to 5°C., and then the mixture was stirred at the same temperature for 30 minutes. After this reaction mixture was poured into 50 ml. of ice water while being stirred and washed with water, an organic layer was collected, and 50 ml. of ice water was added thereto. Then, sodium hydrogen carbonate was added to adjust the pH to 7.0. The organic layer was then washed with water and concentrated under reduced pressure, to obtain a pale brown oil. When washed with ether, there was then obtained 12.2 g. (87 percent) of white crystals of 2-chloro-4-nitrophenol ester of penicillin G sulfoxide having a melting point of 125° to 128°C.

EXAMPLE 11

1.73 ml. of phosphorus oxychloride was added dropwise to the mixture of 2.06 ml. of dimethylformamide and 3 ml. of methylene chloride while being cooled in ice. The mixture was reacted at 25° to 30°C. for 30 minutes.

A suspension of 5.0 g. of penicillin G potassium salt in 16 ml. of methylene chloride was cooled to −50° ± 2°C., and then the former reaction mixture was added dropwise thereto at −50° ± 2°C., and reacted at the same temperature for 4 hours. Crystals of penicillin G potassium salt were dissolved therein to yield a pale yellow clear solution. Then, 2.6 g. of crystals of N-hydroxyphthalimide were added thereto at the same temperature. After 10 minutes, 1.95 ml. of pyridine was added dropwise thereto at −50° ± 2°C. over a period of 10 minutes, and then the crystals were gradually dissolved therein to yield a pale yellow clear solution. Further, after reacting for 30 minutes, the mixture was poured into 20 ml. of water and stirred for 30 minutes. Two layers formed and the lower layer was further washed with water three times. It was then concentrated under reduced pressure, and the residue was washed with ether to obtain 5.47 g. (80 percent) of white crystals of phthalimide ester of penicillin G having a melting point of 182° to 185°C.

EXAMPLE 12

1.73 ml. of phosphorus oxychloride was added dropwise to a mixture of 2.06 ml. of dimethylformamide in 3 ml. of methylene chloride while being cooled in ice, and the mixture was reacted at 25° to 30°C. for 30 minutes.

A suspension of 5.42 g. of penicillin V sulfoxide potassium salt in 16 ml. of methylene chloride was cooled to −50° ± 2°C., and the former reaction mixture was added dropwise thereto at −50° ± 2°C. When the mixture was reacted at the same temperature for 4 hours, the crystals were dissolved therein to yield a pale yellow clear solution. Then, 2.46 g. of 4-nitrobenzylalcohol was added thereto, and 1.95 ml. of pyridine was added dropwise thereto at −50° ± 2°C. over a period of 10 minutes. After the mixture was reacted at the same temperature for 1 hour, the mixture was poured into 20 ml. of water, and stirred for 30 minutes. After the lower layer was washed with sodium hydrogen carbonate solution and then washed with water, the solvent was evaporated under reduced pressure, and there was then obtained 5.4 g. (80.5 percent) of 4-nitrobenzyl ester of penicillin V sulfoxide having a melting point of 163° to 167°C.

EXAMPLE 13

1.73 ml. of phosphorus oxychloride was added dropwise to a mixture of 2.06 ml. of dimethylformamide in 3 ml. of methylene chloride while being cooled in ice, and the mixture was reacted at 20° to 30°C. for 30 minutes.

A suspension of 5.42 g. of penicillin V sulfoxide potassium salt in 16 ml. of methylene chloride was cooled to −50° ± 2°C. and the former mixture was added dropwise thereto at −50° ± 2°C. When reacted at the same temperature for 4 hours, the crystals were dissolved therein to yield a pale yellow clear solution. Then, 3.0 g. of diphenylcarbinol was added to the solution, and 1.95 ml. of pyridine was added dropwise to the mixture at −50° ± 2°C. over a period of 15 minutes. After being reacted at the same temperature for 1 hour, the mixture was poured into 20 ml. of water, and stirred for 30 minutes. The lower layer was further washed with a sodium hydrogen carbonate solution, and then washed with water, and thereafter the solvent was evaporated under reduced pressure. 5.9 g. (82.5 percent) of benzhydryl ester of penicillin V sulfoxide having a melting point of 155° to 156°C. was obtained.

Having now fully described the invention, it will be apparent to one of ordinary skill in the art that many changes and modifications can be made thereto without departing from the spirit or scope of the invention as set forth herein. Accordingly,

What is claimed and intended to be covered by Letters Patent is:

1. A process for producing penicillin or penicillin sulfoxide esters, which comprises:
reacting an N,N-disubstituted acid amide represented by the formula:

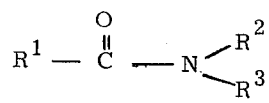

wherein $R^1$ represents hydrogen or lower alkyl, and $R^2$ and $R^3$, which may be the same or different, each represents a lower alkyl group, with a halogenating agent selected from the group consisting of phosphorous oxychloride, phosphorous oxybromide, phosphorous pentachloride, phosphorous pentabromide, sulfurylchloride, thionylchloride, thionylbromide, phosgene, carbonylbromide and thiophosgene, and reacting the thus obtained product with an alkali metal salt of penicillin or an alkali metal salt of penicillin sulfoxide, wherein said penicillin and said penicillin sulfoxide are selected from the group consisting of

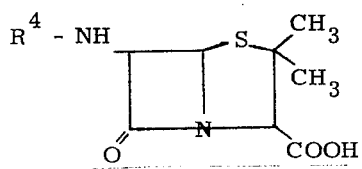 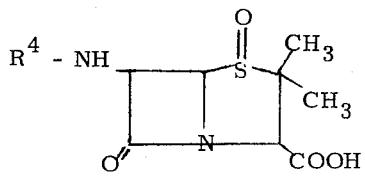

wherein $R^4$ represents thienylacetyl, N-protected-α-aminophenylacetyl, α-aminothienylacetyl and α-aminosubstituted-phenylacetyl, and Penicillin G and V and sulfoxides thereof; and then reacting the product thus obtained with a hydroxy compound represented by the formula R—OH, wherein R represents halogeno lower alkyl, benzoyl lower alkyl, nitro or lower alkoxy substituted phenyl lower alkyl, nitro and halogen substituted phenyl, bisphenyl substituted lower alkyl or phthalimido, in the presence of an organic tertiary amine selected from the group consisting of pyridine, picoline, lutidine, collidine, quinoline, dimethylaniline, diethylaniline and triloweralkylamine.

2. The process according to claim 1, wherein the N,N-disubstituted-acid amide is selected from the group consisting of dimethylformamide, diethylformamide and dimethylacetamide.

3. The process according to claim 1, wherein the halogenating agent is selected from the group consisting of phosphorous oxychloride, phosgene, phosphorous pentachloride and thionylchloride.

4. The process according to claim 1, wherein the hydroxy compound is selected from the group consisting of 2,2,2-trichloroethanol, phenacylalcohol, 4-methoxybenzylalcohol, 2-chloro-4-nitrophenol, N-hydroxyphthalimide, benzhydrylalcohol and 4-nitrobenzylalcohol.

5. The process according to claim 1, wherein the organic tertiary amine is selected from the group consisting of triloweralkylamine and pyridine.

6. The process according to claim 1, wherein the N,N-disubstituted acid amine is selected from the group consisting of N,N-dimethylformamide, N,N-diethylformamide, N,N-dimethylacetamide, N,N-diethylacetamide, N,N-dimethylpropionamide, N,N-dimethylbutylamide, and N,N-dimethylvaleramide.

* * * * *